(12) United States Patent
Zhao

(10) Patent No.: US 9,927,267 B2
(45) Date of Patent: Mar. 27, 2018

(54) SOLAR BATTERY WIRELESS INTEGRATED LOAD CELL AND INCLINOMETER

(71) Applicant: BODE ENERGY EQUIPMENT CO., LTD., Xi'an (CN)

(72) Inventor: Min Zhao, Xi'an (CN)

(73) Assignee: Bode Energy Equipment Co., Ltd., Xi'an (CN)

( * ) Notice: Subject to any disclaimer, the term of this patent is extended or adjusted under 35 U.S.C. 154(b) by 228 days.

(21) Appl. No.: 14/547,345

(22) Filed: Nov. 19, 2014

(65) Prior Publication Data

US 2016/0138949 A1 May 19, 2016

(51) Int. Cl.
*E21B 43/12* (2006.01)
*G01D 21/02* (2006.01)
(Continued)

(52) U.S. Cl.
CPC .......... *G01D 21/02* (2013.01); *E21B 43/127* (2013.01); *E21B 47/0008* (2013.01);
(Continued)

(58) Field of Classification Search
CPC ............... E21B 43/127; E21B 47/0007; E21B 47/0008; F04B 47/022; F04B 47/02;
(Continued)

(56) References Cited

U.S. PATENT DOCUMENTS 4,143,546 A   3/1979 Wiener
4,363,605 A   12/1982 Mills
(Continued)

FOREIGN PATENT DOCUMENTS

CN   2714804 Y   8/2005
CN   2937474 Y   8/2007
(Continued)

OTHER PUBLICATIONS

PCT Notification of Transmittal of the International Search Report and the Written Opinion of the International Searching Authority dated Oct. 12, 2015 in PCT/IB2015/053311.
(Continued)

*Primary Examiner* — Blake A Tankersley

(74) *Attorney, Agent, or Firm* — Morgan, Lewis & Bockius LLP

(57) ABSTRACT

An integrated load cell and inclinometer includes an outer shell including a u-shaped structure configured to receive a polished rod; a load sensor configured output a load signal based on a load experienced by the load sensor; a position sensor configured to output a position signal based on a position experienced by the position sensor; a load and position signal processor configured to receive and process the load signal from the load sensor and to output load signal data representative of the load experienced by the load sensor, and receive and process the position signal from the position sensor and to output position signal data representative of the inclination of the walking beam or the position of the polished rod; a solar battery configured to provide power to the integrated load cell and inclinometer; and a transmitter configured to transmit the load signal data and position signal data.

11 Claims, 11 Drawing Sheets

(51) Int. Cl.
| | |
|---|---|
| *H02S 10/20* | (2014.01) |
| *E21B 47/00* | (2012.01) |
| *F04B 49/06* | (2006.01) |
| *F04B 47/02* | (2006.01) |
| *G01C 9/06* | (2006.01) |
| *G01L 5/00* | (2006.01) |

(52) U.S. Cl.
CPC .......... *F04B 47/022* (2013.01); *F04B 49/065* (2013.01); *G01C 9/06* (2013.01); *G01L 5/0004* (2013.01); *H02S 10/20* (2014.12)

(58) Field of Classification Search
CPC .............. F04B 49/065; F04B 2201/121; F04B 2201/1211; G01D 21/02
See application file for complete search history.

(56) References Cited

U.S. PATENT DOCUMENTS

| | | | |
|---|---|---|---|
| 4,390,321 A | 6/1983 | Langlois et al. | |
| 4,490,816 A | 12/1984 | Kehl | |
| 4,561,299 A | 12/1985 | Orlando et al. | |
| 4,594,665 A | 6/1986 | Chandra et al. | |
| 5,064,349 A | 11/1991 | Turner et al. | |
| 5,182,946 A * | 2/1993 | Boughner ............... | E21B 47/00 702/6 |
| 5,291,777 A | 3/1994 | Chang et al. | |
| 6,114,632 A | 9/2000 | Planas, Sr. et al. | |
| 6,315,523 B1 | 11/2001 | Mills | |
| 6,576,849 B2 | 6/2003 | Bliss et al. | |
| 7,219,723 B2 | 5/2007 | Barnes et al. | |
| 7,345,374 B1 | 3/2008 | Jones et al. | |
| 7,513,752 B2 | 4/2009 | Boone et al. | |
| 7,614,357 B2 | 11/2009 | Hernandez et al. | |
| 7,856,727 B2 | 12/2010 | Chiorean et al. | |
| 7,944,369 B2 | 5/2011 | Appleyard et al. | |
| 8,157,537 B2 | 4/2012 | Chavez Zapata | |
| 8,769,839 B1 | 7/2014 | Paesano et al. | |
| 8,780,055 B2 | 7/2014 | Marchand et al. | |
| 8,866,470 B2 | 10/2014 | Taylor | |
| 9,080,438 B1 | 7/2015 | McCoy et al. | |
| 9,255,506 B2 | 2/2016 | Cook | |
| 2004/0144529 A1 | 7/2004 | Barnes et al. | |
| 2004/0155860 A1 | 8/2004 | Wenstrand et al. | |
| 2005/0089425 A1 | 4/2005 | Boone et al. | |
| 2006/0238336 A1* | 10/2006 | Zajac .................... | G01D 21/02 340/539.22 |
| 2009/0071645 A1 | 3/2009 | Kenison et al. | |
| 2009/0121849 A1* | 5/2009 | Whittaker ............ | G07C 5/0866 340/425.5 |
| 2009/0311107 A1 | 12/2009 | Zapata | |
| 2011/0074334 A1* | 3/2011 | Wang ...................... | G07F 11/00 320/101 |
| 2012/0020808 A1 | 1/2012 | Lawson et al. | |
| 2012/0112546 A1 | 5/2012 | Culver | |
| 2012/0135629 A1 | 5/2012 | Montena | |
| 2012/0222935 A1* | 9/2012 | MacKay ............... | G07F 17/248 194/210 |
| 2013/0127390 A1 | 5/2013 | DaCunha et al. | |
| 2013/0294952 A1* | 11/2013 | Caprathe ............. | F04D 25/0673 417/411 |
| 2013/0333880 A1 | 12/2013 | Raglin et al. | |
| 2015/0345280 A1* | 12/2015 | Krauss .................. | E21B 43/127 700/282 |

FOREIGN PATENT DOCUMENTS

| | | |
|---|---|---|
| CN | 201159059 Y | 12/2008 |
| CN | 102434147 A | 5/2012 |
| CN | 202329895 U | 7/2012 |
| CN | 202417478 U | 9/2012 |
| CN | 202707004 U | 1/2013 |
| CN | 102966346 A | 3/2013 |
| GB | 2475074 A | 5/2011 |
| GB | 24750574 A | 5/2011 |
| WO | 2010/114916 A1 | 10/2010 |
| WO | 2014098873 A1 | 6/2014 |

OTHER PUBLICATIONS

PCT Notification of Transmittal of the International Search Report and the Written Opinion of the International Searching Authority dated Feb. 16, 2016 in PCT/CN2015/094959. Note: CN102434147(A), CN202417478(U), and WO 20101114916 A1 cited therein are already of record.
USPTO Office Action dated Apr. 21, 2016 in related technology U.S. Appl. No. 14/467,574.
Klimitchek, Randal, et al. "Integrated rod-pump controller cuts operating costs," Petroleum Technology Digest, from reprinted World Oil, Oct. 2003 Issue, pp. 1-2.
Tuominen, Julia "Hydraulic Boom Monitoring with IEEE 802.11 Based Wire Sensor Network," Master of Science Thesis, Tampere University of Technology, Apr. 2010, pp. 1-79.
Weatherford, WellPilot-ePIC Intelligent VSD / RPC User Manual, Jul. 2010, Revision B, Table of Contents and "Polished Rod Load Cell Sensor TDS" and "Beam Mounted Load Sensor TDS" portions of Section 6.
USPTO Office Action dated Feb. 2, 2017 in technologically related U.S. Appl. No. 14/828,706.
USPTO Office Action dated Oct. 4, 2016 in related technology U.S. Appl. No. 14/272,105.
USPTO Office Action dated Aug. 18, 2017 in technologically related U.S. Appl. No. 14/828,706.
Solar-Colorado, Optimizing Solar Panel Performance, 2011.
Landau, Optimum Tilt of Solar Panels, 2012.
Communication dated Oct. 19, 2017 in technologically related EP Application No. 15788989.0.

* cited by examiner

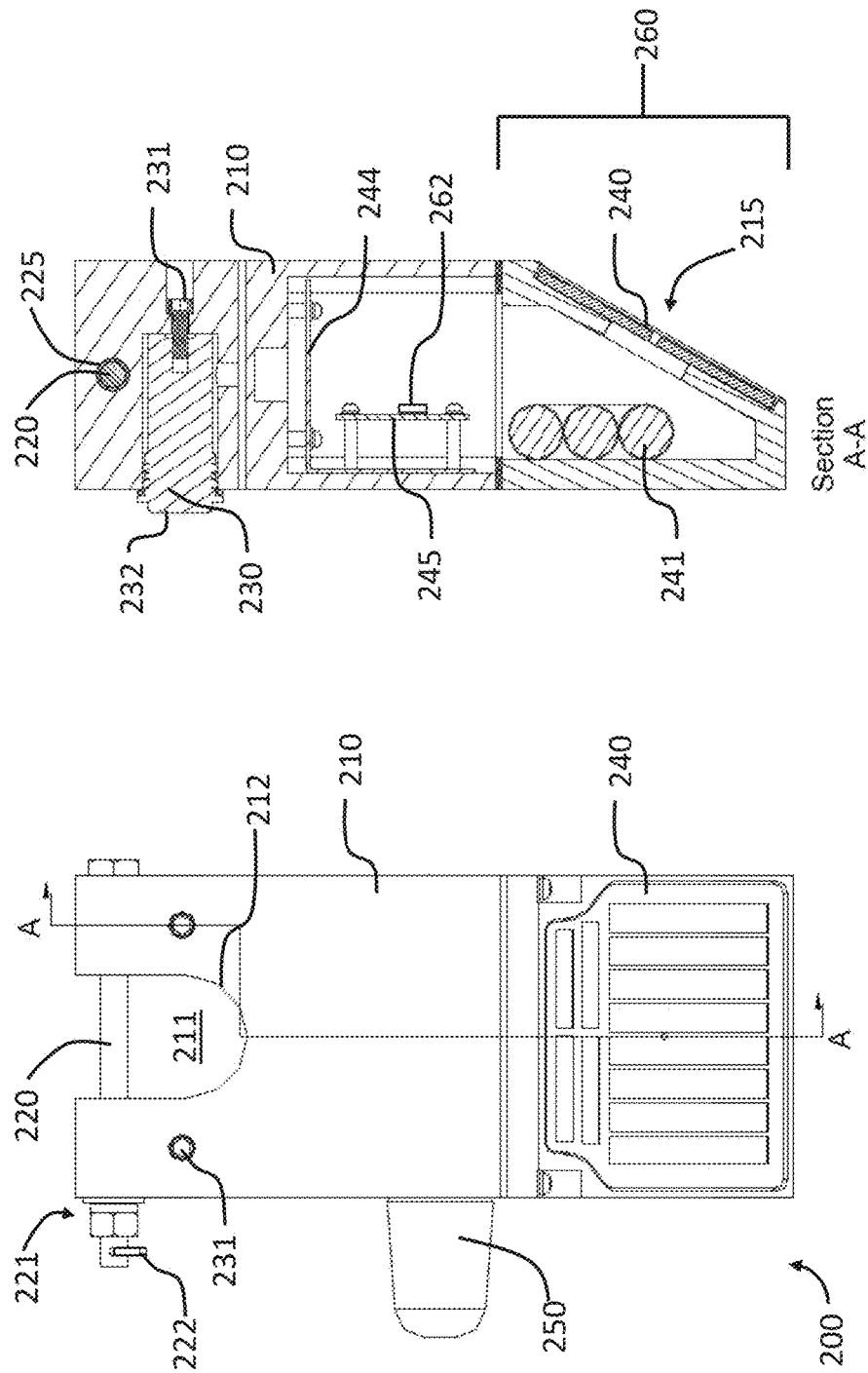

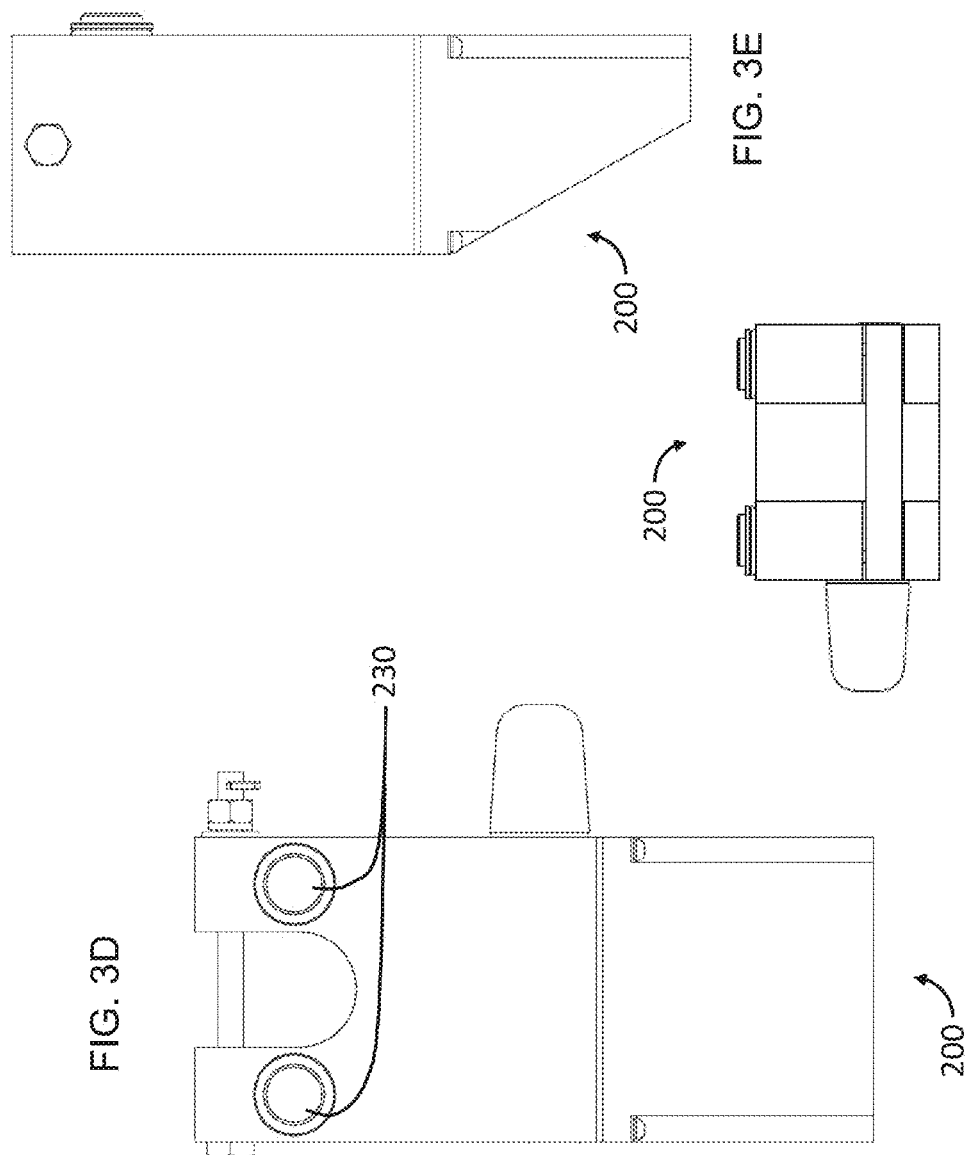

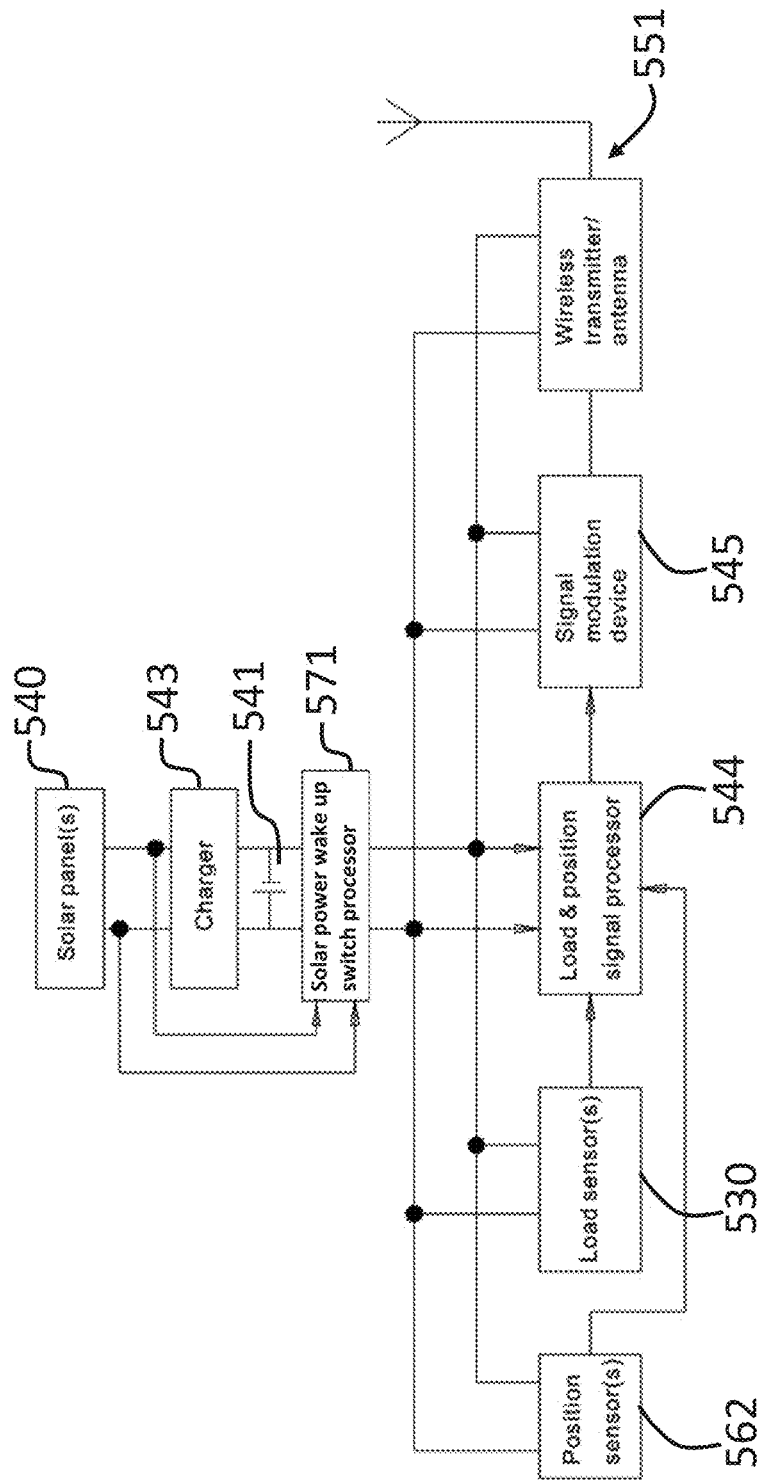

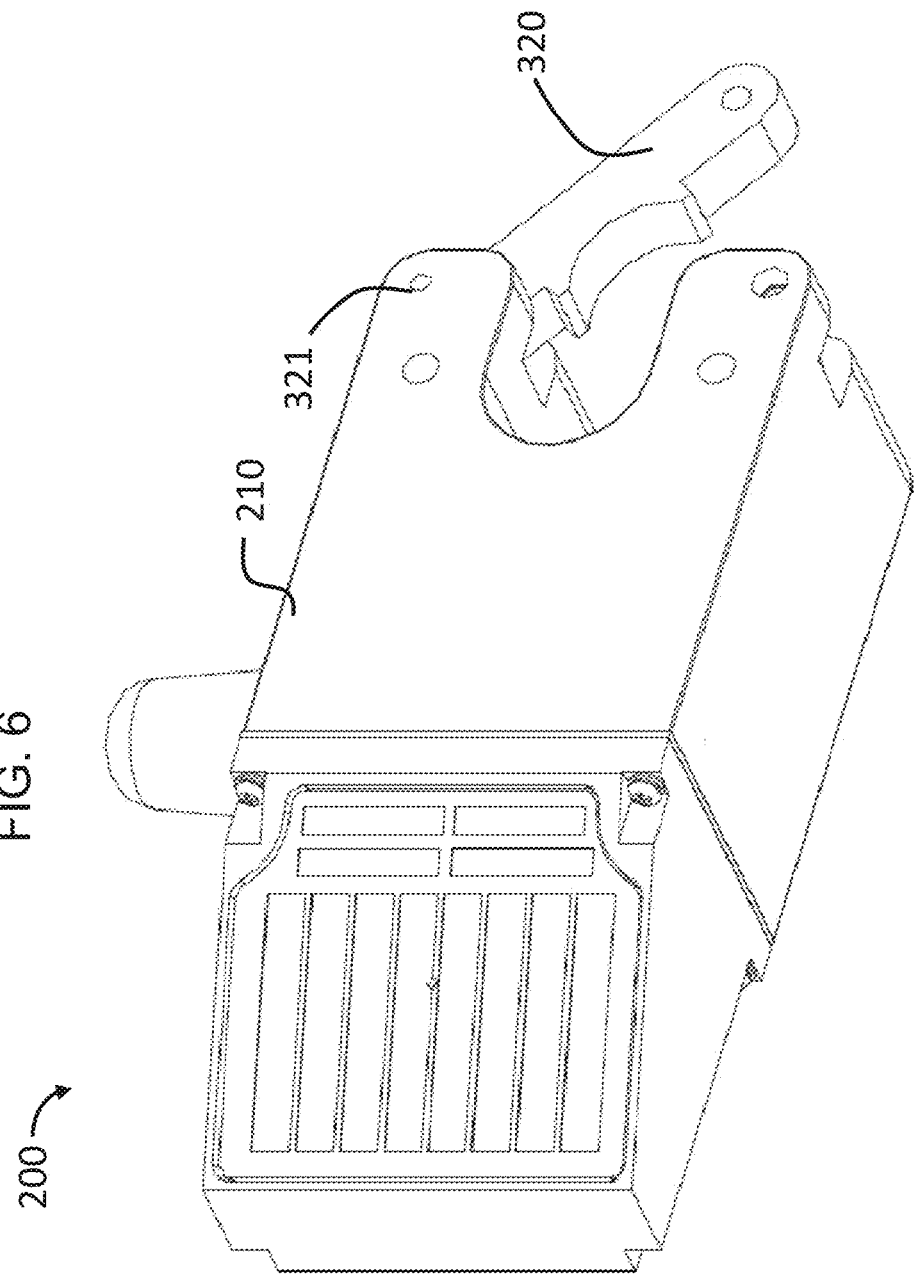

SOLAR BATTERY WIRELESS INTEGRATED LOAD CELL AND INCLINOMETER

FIELD OF THE INVENTION

Embodiments of the present invention relate generally to rod pumping systems. For example, embodiments relate to an apparatus for simultaneously measuring the load on a polished rod of a rod pumping system, an angle of the walking beam in the rod pumping system, and/or the position of the polished rod in the rod pumping system.

BACKGROUND

In the field of oil well rod pumping systems, it is desirable to monitor the strain (or "load") on the polished rod. In this way, malfunctions in the system can be detected and resolved to protect an oil pump from damage. Various solutions have been proposed for how to measure this force on the polished rod. For example, U.S. Pat. Pub. No. 2010/0020808 to Lawson et al. proposes two separate load cells that are "stacked" from the top of the polished rod and respectively measure an upward and a downward force on the polished rod. In order to measure the total force acting on the polished rod, the load cells encircle the polished rod in a ring shape, and are "stacked" at installation. Installation and maintenance of the load cells is therefore a complex process that requires sequential adding or removing the load cells from the top of the polished rod. Furthermore, designs such as Lawson's require multiple load cells in order to measure the respective upward and downward forces on the polished rod. Because it requires multiple load cells, this design is relatively expensive, and because of its need for the load cells to encircle the polished rod, this design makes installation and maintenance of the load cells a time-consuming process. Additionally, Lawson separates the load cells from the devices that power, process, and wirelessly transmit the measured load data. This further increases the cost and complexity of production and maintenance.

In other art, such as U.S. Pat. No. 7,513,752 to Boone et al., monitoring devices rely on indirect measurements that may roughly correlate to the force on the polished rod. For example, Boone discloses a monitoring device with an external scissor-like attachment hooked around the harness cables, asserting that a measurement of the restoring force tending to return the cables to their non-displaced position is generally proportional to the tension in the cables. However, this sort of measurement may be relatively inaccurate, and the scissor-like attachment of Boone is necessarily external to the monitoring device, thereby being affected by the outdoor elements and all of the maintenance issues associated therewith.

Furthermore, inclinometers are used in rod pumping systems to measure the angle of a walking beam. This measurement is helpful for determining the operating status of a rod pumping system. For example, an inclinometer installed on a beam of a polished rod pumping system may be used to determine the running distance of the polished rod during pumping operation. Based on the polished rod running distance, information on the pump running status can be obtained.

Existing inclinometers are typically powered by an external power supply, which is often an independent power source needing regular replacement and maintenance. U.S. Pat. No. 7,219,723 to Barnes shows an example of an external power supply. Because the power supply is external to the inclinometer, resulting wires are easily damaged due to the environment (e.g., water and heat). Water can also leak into the inclinometer at the places where the external wires are connected to the inclinometer. Furthermore, installation of the inclinometer is difficult due to the separate external power supply and other external components. Attaching such an inclinometer to the walking beam can be awkward, but placement should be precise in order to obtain accurate measurements.

SUMMARY

An integrated load cell and inclinometer is provided for transmitting load data and position data of a polished rod in a rod pump system having a rod clamp fixed to a top of the polished rod and a clamping bar fixed to a hanger harness attached to a horsehead, the horsehead attached to a walking beam. The integrated load cell and inclinometer includes: an outer shell including a u-shaped structure having two protrusions, the u-shaped structure configured to receive the polished rod, and the outer shell configured to be positioned between the rod clamp and the clamping bar of the rod pump system; a load sensor configured to receive a voltage and output a load signal based on a load experienced by the load sensor; a position sensor configured to receive a voltage and output a position signal based on a position experienced by the position sensor; a load and position signal processor configured to: receive and process the load signal from the load sensor and to output load signal data representative of the load experienced by the load sensor, and receive and process the position signal from the position sensor and to output position signal data representative of the inclination of the walking beam or the position of the polished rod, wherein the load signal processor is internal to the outer shell of the load cell; a modulator configured to receive the load signal data and position signal data from the load signal processor, to modulate the load signal data and the position signal data, and to output the modulated load and position signal data, wherein the modulator is internal to the outer shell of the load shell; a wireless transmitter configured to receive the modulated load and position signal data from the modulator and to wirelessly transmit the modulated load and position signal data; a solar battery configured to provide power to the integrated load cell and inclinometer, the solar battery including: a solar panel that is mounted externally on the outer shell of the integrated load cell and inclinometer; a battery that is internal to the outer shell of the integrated load cell and inclinometer; a charger that is internal to the outer shell of the integrated load cell and inclinometer and that is electrically connected to the solar panel and the battery, wherein the charger is configured to receive current from the solar panel and to charge the battery; and wherein the solar battery is configured to provide the voltage to the load sensor and the position sensor.

An integrated load cell and inclinometer is provided for transmitting load data and position data of a polished rod in a rod pump system having a rod clamp fixed to a top of the polished rod and a clamping bar fixed to a hanger harness attached to a horsehead, the horsehead attached to a walking beam. The integrated load cell and inclinometer comprising: an outer shell including a u-shaped structure having two protrusions, the u-shaped structure configured to receive the polished rod, and the outer shell configured to be positioned between the rod clamp and the clamping bar of the rod pump system; a load sensor configured output a load signal based on a load experienced by the load sensor; a position sensor configured to output a position signal based on a position experienced by the position sensor; a load and position signal processor configured to: receive and process the load signal from the load sensor and to output load signal data representative of the load experienced by the load sensor, and receive and process the position signal from the position sensor and to output position signal data representative of the inclination of the walking beam or the position of the polished rod, a solar battery configured to provide power to the integrated load cell and inclinometer; and a transmitter configured to transmit the load signal data and position signal data.

BRIEF DESCRIPTION OF THE DRAWINGS

The accompanying drawings, which are included to provide a further understanding of embodiments of the invention and are incorporated in and constitute a part of this specification, illustrate embodiments of the invention that together with the description serve to explain the principles of embodiments of the invention. Throughout the drawings, same or similar reference numbers may be used to indicate same or similar parts. In the drawings:

FIG. 3A illustrates a top view of an integrated load cell and inclinometer according to an embodiment of the present invention;

FIG. 3B illustrates a cross-section of the integrated load cell and inclinometer at A-A of FIG. 3A;

FIG. 3C is a side view of the integrated load cell and inclinometer of FIG. 3A;

FIG. 3D is a bottom view of the integrated load cell and inclinometer of FIG. 3A;

FIG. 3E is another side view of the integrated load cell and inclinometer of FIG. 3A;

FIG. 5B illustrates a block diagram of circuitry of an integrated load cell and inclinometer according to an embodiment of the present invention;

FIG. 6 illustrates a perspective view of an integrated load cell and inclinometer according to an embodiment of the present invention;

DETAILED DESCRIPTION

Reference will now be made in detail to embodiments of the present invention, examples of which are illustrated in the accompanying drawings. It is to be understood that the figures and descriptions included herein illustrate and describe elements that may be of particular relevance to the present invention, while eliminating, for purposes of clarity, other elements found in typical rod pumping systems or methods.

Figure 1:
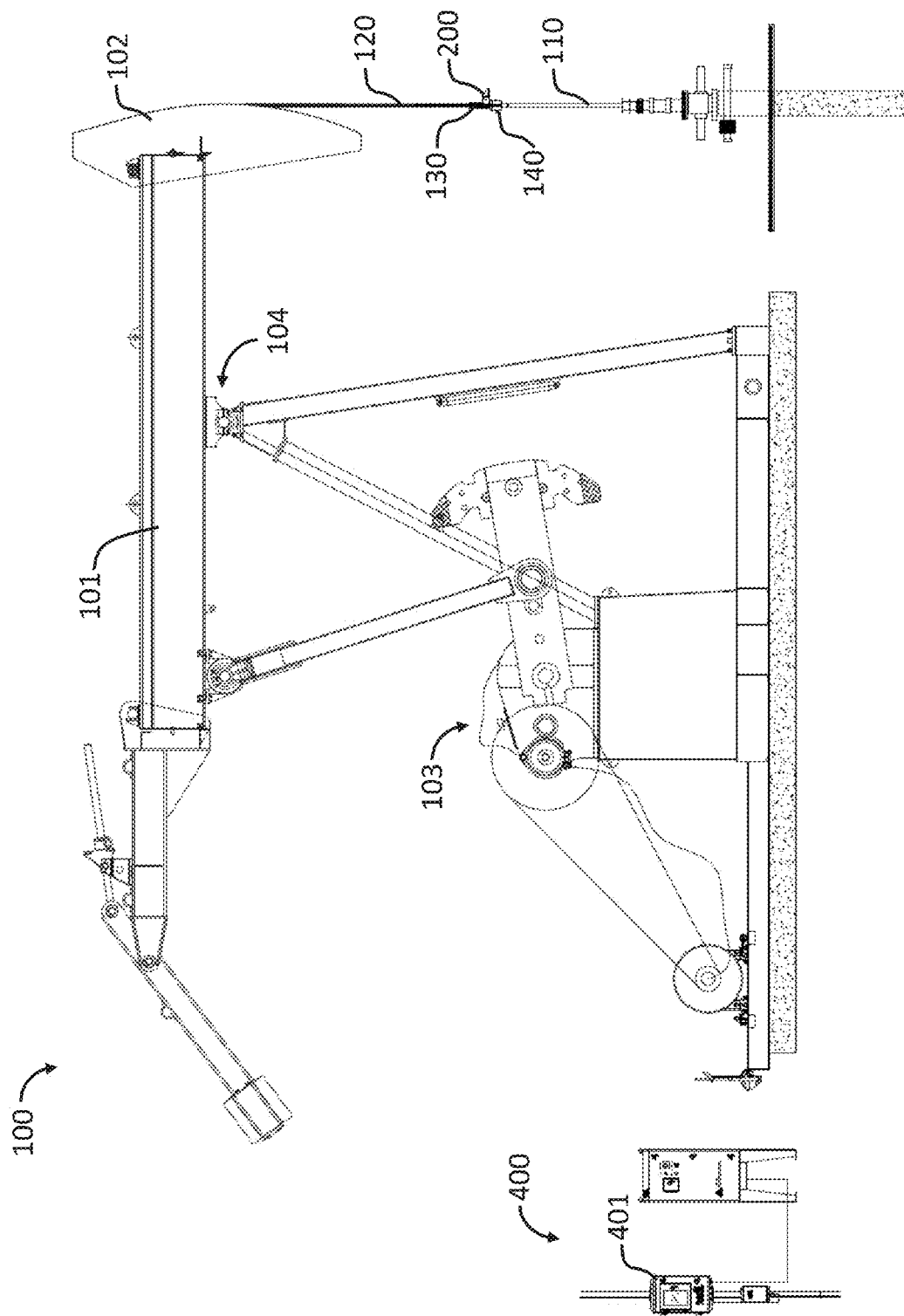
FIG. 1 illustrates an example rod pumping system together with an embodiment of an integrated load cell and inclinometer of the present invention.

FIG. 1 illustrates a rod pumping system 100 which may be used to pump oil and whose mechanisms are generally known in the art, together with an embodiment of an integrated load cell and inclinometer 200 of the present invention. The example rod pumping system 100 includes a walking beam 101, horsehead 102, motor and gear drive 103, hanger harness 120, polished rod 110, polished rod clamp 130, and clamping bar 140. As the horsehead 102 moves up and down during operation of the rod pumping system 100, so do the hanger harness 120 and polished rod 110. As will be shown in FIG. 2B, the integrated load cell and inclinometer 200 is positioned to measure position of and axial forces on the polished rod 110 during this operation.

Figure 2B:
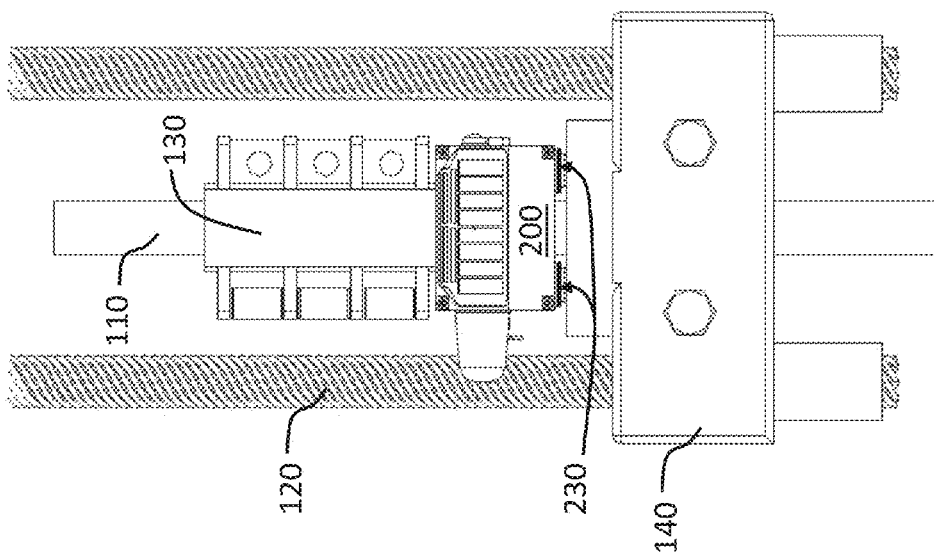
FIG. 2B illustrates an integrated load cell and inclinometer of an embodiment of the present invention installed within the connection system of FIG. 2A.
Figure 2A:
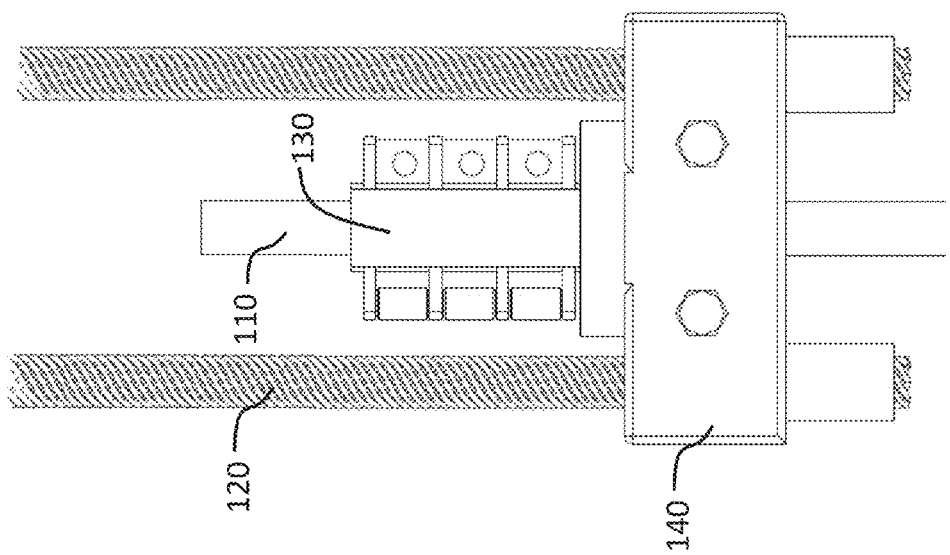
FIG. 2A illustrates a connection system between a harness and a polished rod of the rod pumping system before installation of the integrated load cell and inclinometer.
Figure 2C:
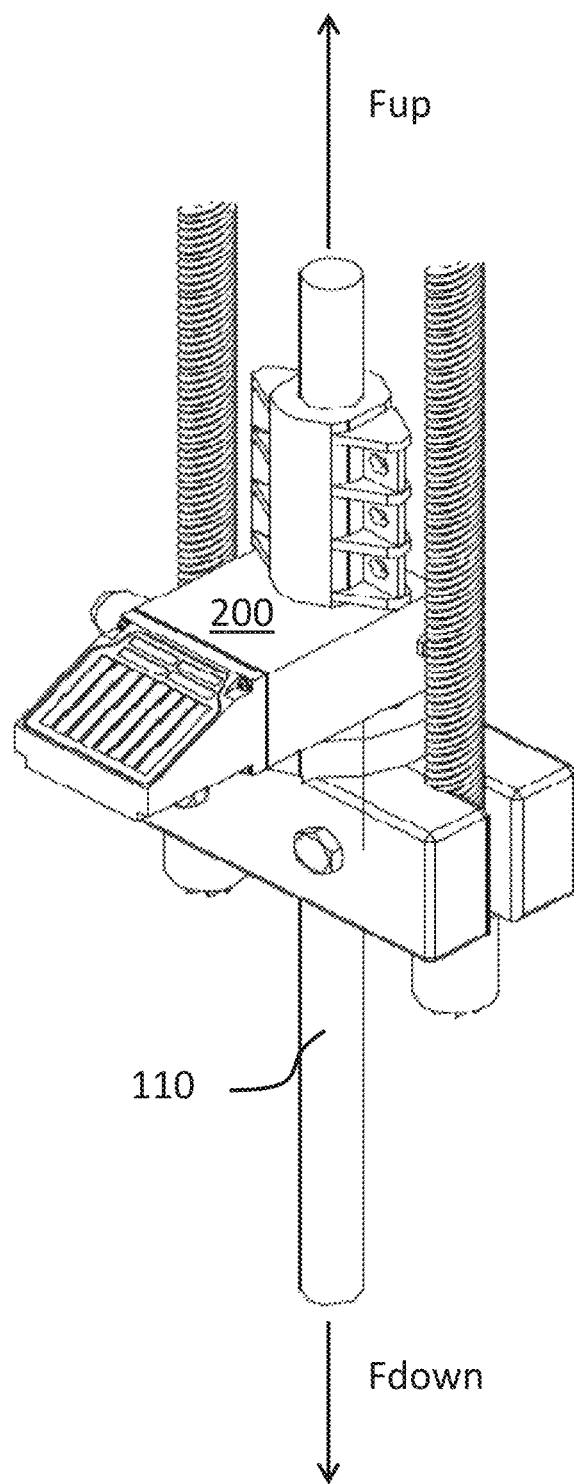
FIG. 2C illustrates a perspective view of the system of FIG. 2A and includes example forces acting upon the polished rod of a rod pumping system.
Figure 2D:
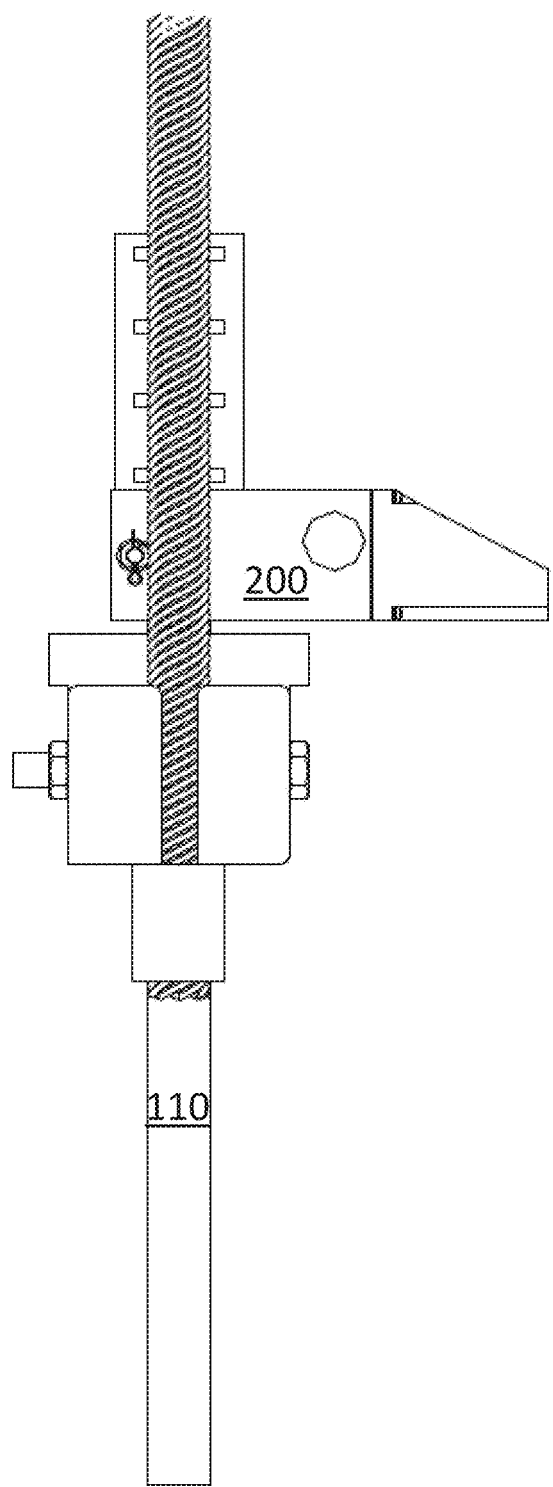
FIG. 2D illustrates a side view of FIG. 2B.

FIG. 2A shows an example of a hanger harness 120 and polished rod 110 connection system, as may be used in the rod pumping system 100 of FIG. 1. The hanger harness 120 may be formed of materials, including, for example, rope or metal cable, and may connect to the horsehead 102 of the pumping system 100 as shown in FIG. 1. As the pumping system operates, the polished rod 110 may be subject to both an axially upward force or strain $F_{up}$ and an axially downward force or strain $F_{down}$ (see FIG. 2C). The polished rod clamp 130 may be fixed to the polished rod 110 and may thereby maintain the connection between the polished rod 110, the hanger harness 120 and the clamping bar 140.

As shown in FIG. 2B, the integrated load cell and inclinometer 200 may be configured such that it is easily placed between the existing clamping bar 140 and polished rod clamp 130 of the rod pumping system 100 without requiring the removal of the polished rod clamp 130. For example, a gap may be provided between the polished rod clamp 130 and the clamp bar 140, and the integrated load cell and inclinometer 200 may be laterally placed within this gap such that a u-shaped portion of the integrated load cell and inclinometer (discussed below) receives the polished bar 110. By including the inclinometer in the integrated load cell and inclinometer 200, attachment of the inclinometer to the rod pumping system is simple compared to the traditional placement of an inclinometer on the walking beam.

This single integrated load cell and inclinometer 200 may directly measure the combined upward and downward forces $F_{up}$ and $F_{down}$ (see FIG. 2C) exerted on the polished rod 110 through transducer(s)/load sensor(s) 230, which will be described in more detail with reference to later figures. This ability to directly measure the forces on the polished rod 110 enables the integrated load cell and inclinometer to measure the load more accurately than in the related art. Furthermore, as will be discussed below, the integrated load cell and inclinometer 200 may be capable of independently providing power to itself and may internally include all the circuitry necessary to process the reading from transducer 230 and wirelessly transmit the resulting load signal to a receiver or other monitoring system.

The integrated load cell and inclinometer 200 may further include a position sensor 262. The position sensor 262 may be configured to receive a power supply voltage and output a "position" signal based on a position experienced by the position sensor 262. As will be discussed below, the integrated load cell and inclinometer 200 may internally include all the circuitry necessary to process the reading from position sensor 262 and wirelessly transmit the resulting position signal to a receiver or other monitoring system.

FIG. 3A shows a top view of an integrated load cell and inclinometer 200 according to an embodiment of the present invention. This integrated load cell and inclinometer 200 may include an outer shell 210 having a u-shaped portion 211 formed by a gap in the outer shell 210. The u-shaped portion 211 may have two laterally protruding portions and may be sized to receive the polished rod 110 when the integrated load cell and inclinometer 200 is installed in a rod pumping system. In example embodiments, the outer shell is made of metal. The u-shaped portion 211 of the outer shell 210 may have a surface 212 that is continuously smooth. After the u-shaped portion 211 of the integrated load cell and inclinometer 200 is placed around the polished rod 110 at installation, the integrated load cell and inclinometer 200 may be laterally secured to the polished rod 110 with fixing bar 220. For example, fixing bar 220 may be inserted in holes 225 of the laterally protruding portions of the u-shaped portion 211. Fixing bar 220 may be or resemble a bolt and may be secured to the integrated load cell and inclinometer 200 by use of a nut and/or washer 221. In a preferred embodiment and for additional security, the fixing bar 220 may be further secured to the integrated load cell and inclinometer 200 with a cotter pin 222.

The integrated load cell and inclinometer 200 in accordance with embodiments of the present invention is designed to be relatively maintenance free. However, if the integrated load cell and inclinometer 200 needs to be removed from the rod pumping system 100 for any reason, this can easily be done by first removing the fixing bar 220 and then removing integrated load cell and inclinometer 200 laterally from the polished rod 110.

With reference to FIGS. 3B and 3D, the integrated load cell and inclinometer 200 may include two transducers (also herein referred to as "load sensors"). The load sensors 230 may include flat bottom surfaces 232 that protrude on the bottom side of the integrated load cell and inclinometer 200 and that are configured to make physical contact with the clamping bar 140, as shown for example in FIG. 2A. In example embodiments, because the structure of the integrated load cell and inclinometer 200 is such that it can be placed between this clamping bar 140 and the hanger harness 130, the transducers 230 of a single integrated load cell and inclinometer 200 can measure both upwards and downwards axial forces exerted on the polished rod 110. The integrated load cell and inclinometer 200 may be configured such that when it is installed, the flat surfaces 232 of the transducers 230 are flush with the clamping bar 140, and a top surface of the outer shell 210 is flush with the polished rod clamp 130. In this way, the forces acting upon the integrated load cell and inclinometer 200 may accurately and directly reflect the forces acting upon the polished rod 110.

By application of an input voltage, the transducers 230 may convert the forces they experience into electrical signals. These transducers 230 may be, for example, strain gauge transistors, which can change resistance based on the strain they experience. However, other types of transducers may be used. For example, in some embodiments, the transducers may be of semiconductor type.

Figure 4:
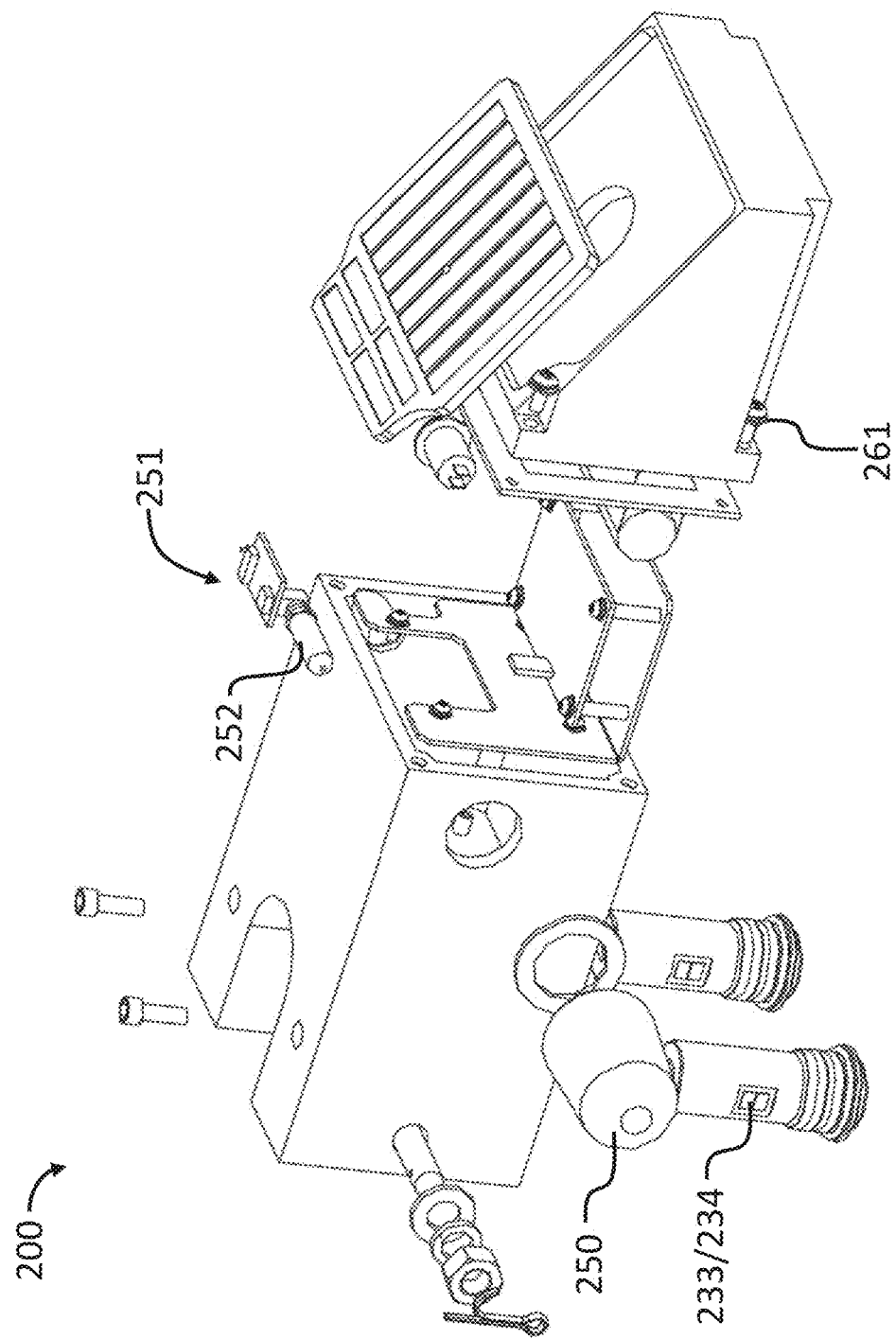
FIG. 4 illustrates an exploded view of an integrated load cell and inclinometer according to an embodiment of the present invention.

With reference to FIG. 4, the transducers 230 may receive input voltage (power) and output a voltage reading that varies based on strain. For example, strain gauges 233 and 234 of the transducers 230 may detect the deformation of the metal elements of the transducers 230 due to an applied force, and send a signal corresponding to this deformation so as to detect the variation of the applied force. Furthermore, as will be discussed below, the transducers may receive voltage from a power source integrated inside the outer shell 210 of the integrated load cell and inclinometer 200, thereby eliminating the need for an external power source.

With reference to FIG. 3D, in a preferred embodiment, the two transducers 230 may be cylindrically shaped and arranged so as to be diametrically opposed across the gap forming the u-shaped portion 211 relative to a position of the polished rod 110. This placement of the two transducers 230 may allow them to measure the entire upward and downward force exerted on the polished rod 110 without the need to completely encircle the polished rod 110, as in related art. Because the transducers do not need to encircle the polished rod 110, this placement also allows the integrated load cell and inclinometer 200 to be easily installed in an existing rod pumping system without having to "stack" the integrated load cell and inclinometer 200 from the top of the polished rod.

The transducers 230 may be placed at the bottom of the integrated load cell and inclinometer 200, as shown for example in FIG. 3B. This placement at the bottom of the integrated load cell and inclinometer 200 may protect the transducers from the outdoor elements. Meanwhile, in a preferred embodiment, the transducers 230 are centered and secured by bolts 231, which are inserted from the top of the integrated load cell and inclinometer 200. In one embodiment, these bolts 231 may be hexagon bolts such as those having international grade number GB/T70.1.

With reference to FIGS. 3B and 4, the integrated load cell and inclinometer 200 may include the position sensor 262. In an example, the position sensor 262 may be an accelerometer that measures moving acceleration. For example, in some embodiments, the position sensor 262 may include accelerometer circuitry such as, for example, the Analog Devices™ ADXL203 accelerometer.

The position sensor 262 may output an electrical signal (a "position signal") that may be used to determine the position of the polished rod 110 and/or inclination of the walking beam 101. Such a determination may be performed by a processor such as signal processor 544 (also discussed below in relation to FIGS. 5A and 5B).

In embodiments where the position sensor 262 is an accelerometer that measures the moving acceleration, the signal processor 544 may thereby determine the moving distance of the load cell (corresponding to the moving distance of the polished rod/horse head) according to Equation 1-1:

$$S \iint_{t1}^{t2} a(t) dt dt \quad [1\text{-}1]$$

In the above Equation 1-1, 'S' represents the moving distance of the load cell, 'a(t)' represents the acceleration of the load cell as measured by position sensor 262, 't1' represents the starting time for the integral function, and 't2' represents the end time for the integral function. According to this equation, the moving distance of the load cell from time 't1' to time 't2' equals two times the integral of the measured acceleration from time 't1' to time 't2'.

A position of the polished rod 110 and/or angle of the walking beam 101 may thereby be determined according to the calculated moving distance of the load cell and known parameters of the rod pumping system 100, such as, for example, the lengths of the walking beam 101, horsehead 102, harness 120, polished rod 110, and position of pivot point 104, according to common trigonometric equations that are known in the art.

In some embodiments, the position sensor 262 may include circuitry to measure the moving angle directly by, for example, sensing changes to tilt. This may also be accomplished with an accelerometer such as the Analog Devices™ ADXL203 accelerometer, although this example is provided for illustration only and embodiments are not limited thereto.

In some embodiments, the outer shell 210 of the integrated load cell and inclinometer 200 includes a slanted portion 215. This slanted portion 215 may include solar panel(s) 240 for providing power to the integrated load cell and inclinometer. In contrast to other elements of the integrated load cell and inclinometer 200, the solar panels 240 may be mounted externally on the outer shell 210. In one embodiment, the solar panels 240 may be connected in parallel to a charger and an electrical power storage 241 such as a battery. Furthermore, the solar panels 240, power storage 241, a charger and load signal processor on circuit board 245, and a wireless transmitter 251 (see FIG. 4) may be successively connected in parallel, as will be discussed in more detail below with regard to the embodiments shown in FIGS. 5A and 5B. Structure 244 may provide support for the circuit board 245. The solar panels may produce current from incident light.

With reference to FIGS. 3B and 4, the slanted portion 215 of the integrated load cell and inclinometer 200 including at least the solar panels 240 and power storage 241 may form a power supply unit 260. In some embodiments, this power supply unit 260 may be easily attachable and detachable from the rest of the integrated load cell and inclinometer 200 through use of bolts 261. In this way, the integrated load cell and inclinometer 200 can provide an integrated, encapsulated package that has all the desired functionality while still allowing the power storage/battery 241 to be easily replaced as it ages.

With respect to FIG. 4, in some embodiments, the wireless transmitter 251 is mounted inside the outer shell 210 and includes an antenna 252 that protrudes outside the outer shell and that is protected from the outdoor elements by an antenna cover 250. This antenna cover 250 may be plastic or another material that limits interference with wireless signals. The wireless transmitter 251 may transmit load data to, for example, a nearby receiver, station, or other device that can monitor the measured load on the polished rod 110.

For example, with reference to FIG. 1, in some embodiments of the invention, the wireless transmitter 251 may transmit data via the antenna to, for example, a nearby receiver, station, or other device that can monitor the measured load on the polished rod 110, position of the polished rod 110, and/or incline of the walking beam 101. For example, the wireless transmitter 551 may transmit modulated position/incline and load data to a wireless receiver module 401 connected to a rod pump controller 400 in order that the rod pumping system 100 may be appropriately controlled and monitored.

Figure 5A:
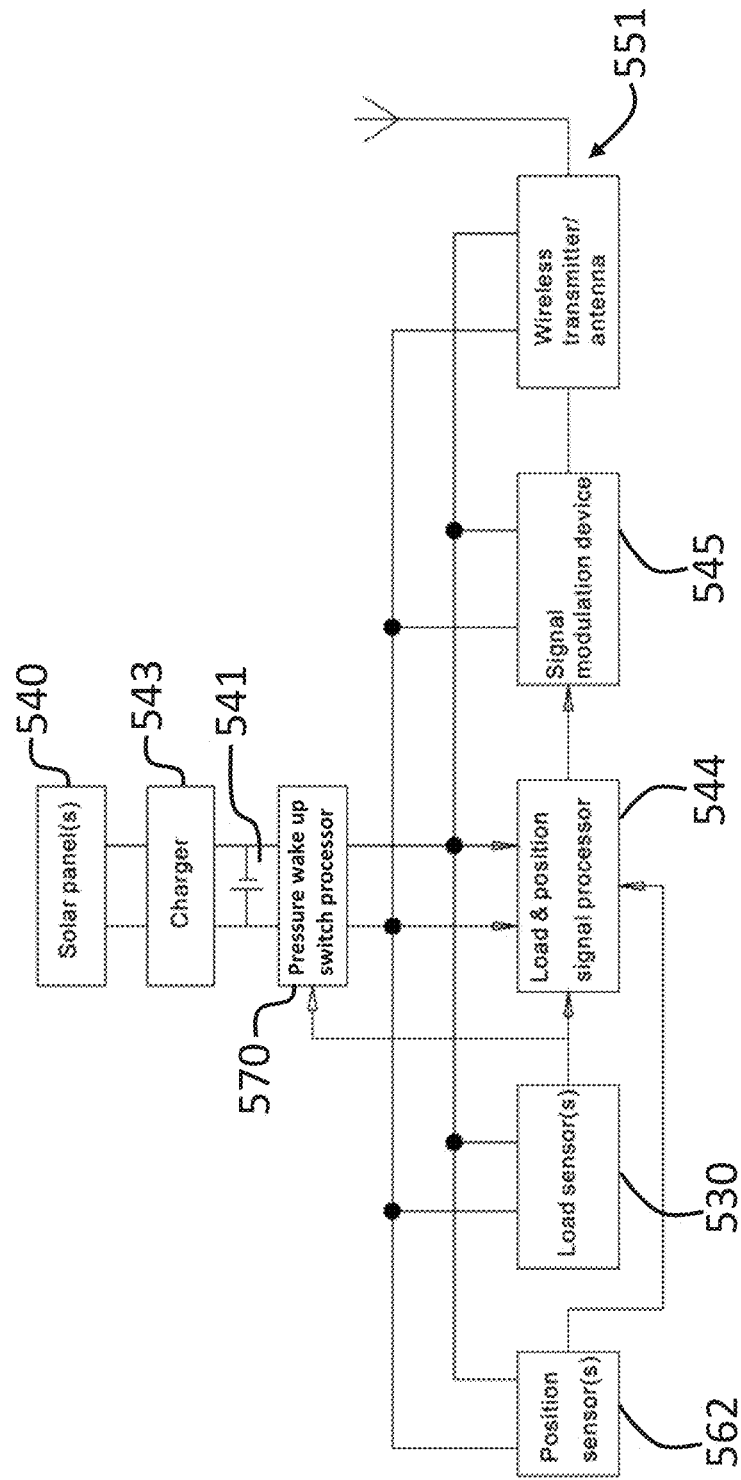
FIG. 5A illustrates a block diagram of circuitry of an integrated load cell and inclinometer according to an embodiment of the present invention.
Figure 7C:
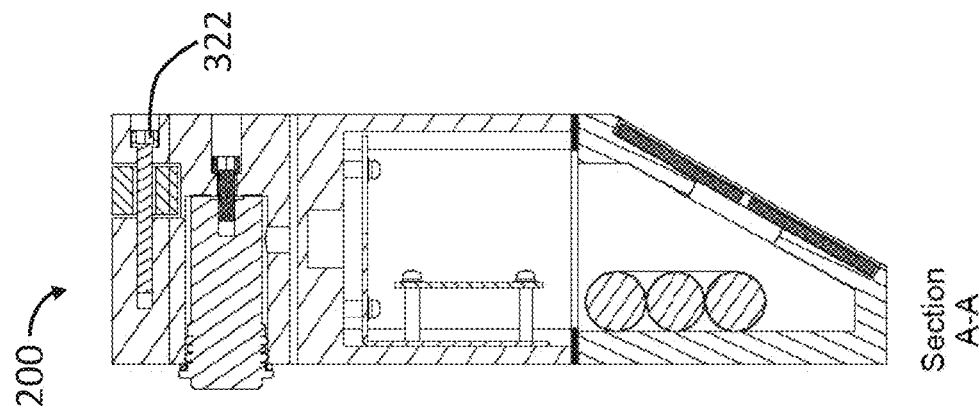
FIG. 7C illustrates a cross-section of the integrated load cell and inclinometer at A-A of FIG. 7B.
Figure 7B:
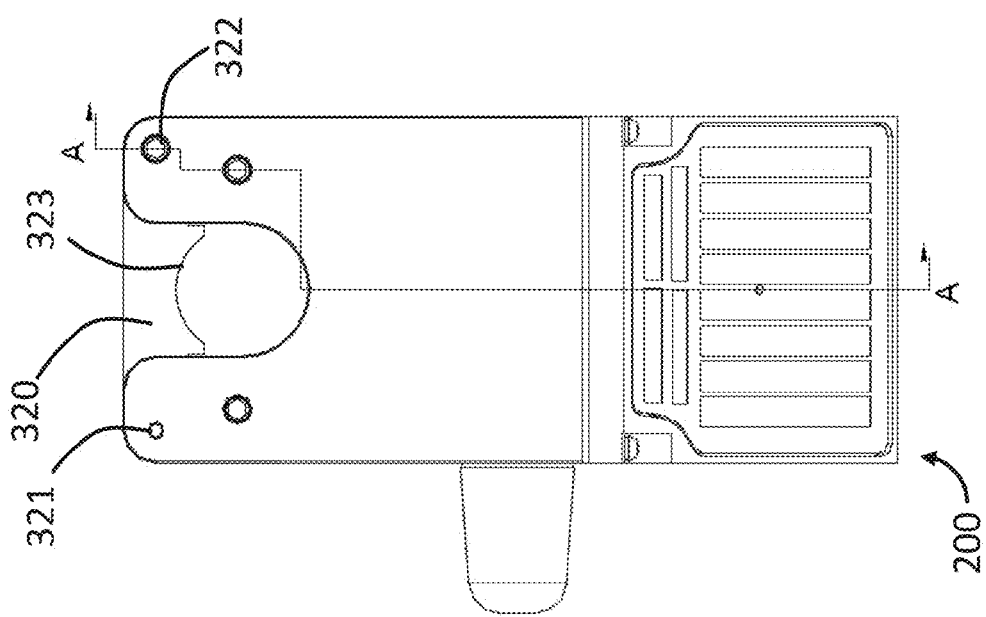
FIG. 7B illustrates a top view of the integrated load cell and inclinometer of FIG. 6.
Figure 7A:
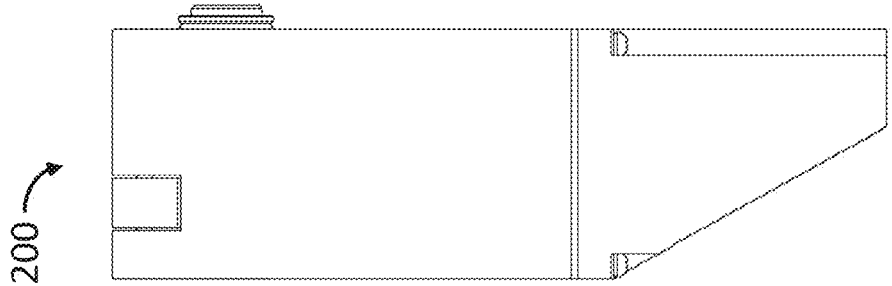
FIG. 7A illustrates a side view of the integrated load cell and inclinometer of FIG. 6.

FIG. 5A illustrates a schematic circuit configuration of the solar battery wireless integrated load cell and inclinometer according to some embodiments of the invention. The circuit configuration may include solar panel(s) 540, a charger 543, a power storage/battery 541, a load and position signal processor 544, a signal modulation device 545, a wireless transmitter/antenna 551, load sensor(s) 530, and position sensor(s) 562. While FIG. 5A shows signal modulation device 545 separate from the wireless transmitter 551, in some embodiments, the signal modulation device 545 may be included as part of the wireless transmitter 551. Furthermore, in some embodiments, the modulation device 545 or wireless transmitter 551 can include an amplifier and/or other transmission equipment. In some embodiments, the charger 543 may be included on the same circuit board as circuitry for the signal modulation device 545 and/or load and position signal processor 544. The solar panel 540 is used to generate and supply electricity to the integrated load cell and inclinometer, and may comprise a set of solar photovoltaic modules electrically connected and mounted to an outer shell of the integrated load cell and inclinometer. The solar panel 540 may be connected to the charger 543 and the power storage/battery 541. The charger 543 may receive current from the solar panel 540 and charge the power storage/battery 541 with energy based on this current. The power storage/battery 541 is further connected to the load and position signal processor 544, the signal modulation device 545, the load sensors 530, and the position sensor(s) 562, to supply power to those elements.

The load sensors 530 may be configured to measure and transmit load signals to the load and position signal processor 544. And, as discussed above, the position sensor(s) 562 may be configured to measure and transmit a position signal based on a position experienced by the position sensor(s) 562 (such as acceleration) to the load and position signal processor 544.

The load and position signal processor 544 may receive the load signals from the load sensors 530, calculate a load experienced by the polished rod 110 based on these load signals, and output this processed load signal data. For example, the load signal processor 544 may perform this calculation based on a recognition that the load experienced by the polished rod 110 is proportional to the sum of the load signals from both load sensors 530. The processed load signal data may be further transmitted to the load signal modulation device 545 (which, in some embodiments, is included in wireless transmitter 551) to perform signal modulation. After the load signal data is processed and modulated, it may be amplified and transmitted via the wireless transmitter/antenna 551.

Furthermore, the load and position signal processor 544 may receive the signal(s) from the position sensor(s) 562, calculate a position of the polished rod 110 and/or inclination of the walking beam 101 based on the signal(s) from the position sensor(s) 562 and according to Equation 1-1 discussed above, and output this processed position and/or inclination data. As with the processed load signal data, the processed position and/or inclination data may be further transmitted to the signal modulation device 545 to perform signal modulation. After the position and/or inclination data is processed and modulated, it may be amplified and transmitted via the wireless transmitter/antenna 551. Therefore, in some embodiments, the integrated load cell and inclinometer may simultaneously measure load and position data and transmit the load and position data.

In embodiments of the present invention, as the solar panel 540 supplies power to the charger 543 and the power storage/battery 541, any electric cable connected to an exterior power source is eliminated. Therefore, embodiments in accordance with the present invention may improve the energy efficiency and facilitate the maintenance of the integrated load cell and inclinometer equipment. In embodiments of the invention, the above circuitry may include non-transitory computer readable storage mediums for providing appropriate instructions to the processor(s).

Furthermore, in some embodiments of the invention, a special signal processing application is used in order to decrease energy loss. The solar panels 540, charger 543, and electrical power storage 541 may help to ensure stable or constant current for the integrated load cell and inclinometer even during cloudy days, night time, or other low-light situations. In some embodiments of the invention, the power supply may connect to the load sensor(s) 230, position sensor 562, load and position signal processor 544, and signal modulation device 545 in parallel.

In some embodiments of the invention, there may be no contact switch provided on the integrated load cell and inclinometer to control power to the circuitry. Instead, there may be a wake up switch processor between the charger, battery and other circuitry which consumes energy. This wake up switch processor may "turn on" the battery and the rest of the energy consumption circuitry and serve the function of a switch. By using a wake up switch processor instead of a contact switch, there is no possibility for water to enter the interior of the integrated load cell and inclinometer through such a switch. Furthermore, accidental switches to "power on" may be avoided during transport. The wake up switch processor may be located on a same circuit board (e.g., circuit board 245 of FIG. 3B) as other circuitry.

As shown in FIG. 5A, in some embodiments, the wake up switch processor may include a pressure wake up switch processor 570. The pressure wake up switch processor 570 may be configured to measure the pressure on the integrated load cell and inclinometer once every several seconds. For example, once every two seconds, the pressure wake up switch processor 570 may provide a voltage to the load sensor(s) 530 from power storage 451 and measure the pressure based on the load signals transmitted from the load sensor(s) for a short time of 20 milliseconds. When, for example, the integrated load cell and inclinometer is installed on the polished rod and has a pressure corresponding therewith, the pressure wake up switch processor may detect this pressure and fully "turn on" power to the circuitry.

As shown in FIG. 5B, in some embodiments, the wake up switch processor may include a solar power wake up switch processor 571. The solar power wake up switch processor 571 may be configured to measure a voltage and/or current of the solar panel(s) 540. When, for example, the solar power wake up switch processor 571 detects more than dark current from the solar panel(s) 540, the solar power wake up switch processor 571 may "turn on" power to the circuitry. For example, before being installed on a polished rod, the solar panel(s) 540 of the integrated load cell and inclinometer 200 may be covered with a black plastic foil such that substantially only a dark current flows from the solar panel(s) 540. This black foil may be removed at installation. In this way, the solar power wake up switch processor 571 may detect when the integrated load cell and inclinometer 200 is installed in an oil rod pumping system and therefore turn the system on.

With reference to FIGS. 6 and 7A-7C, in one embodiment of the invention, the integrated load cell and inclinometer 200 may be secured to the polished rod 110 with a hinged latch 320. The latch 320 may be hinged on outer shell 210 with a hinge 321. The latch 320 may thus be capable of opening and closing using this hinge 321 as a pivot point, and the other end of the latch 320 may be secured to the integrated load cell and inclinometer 200 when in a "closed" position with a bolt 322. Furthermore, the latch 320 may include an arced portion 323 that, together with the u-shaped portion 211 of the integrated load cell and inclinometer 200, encircles the polished rod 110 in a roughly circular shape. This design may even further simplify installation of the integrated load cell and inclinometer 200 on the polished rod 110.

Any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Embodiments set forth below correspond to examples of integrated load cell and inclinometer implementations of the present invention. However, the various teachings of the present invention can be applied in more than the embodiments set forth below as would be recognized by one skilled in the art.

As will be appreciated by those skilled in the art, changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. An integrated load cell and inclinometer for transmitting load data and position data of a polished rod in a rod pump system having a rod clamp fixed to a top of the polished rod and a clamping bar fixed to a hanger harness attached to a horsehead, the horsehead attached to a walking beam, the integrated load cell and inclinometer comprising:
   an outer shell including a slanted structure and a u-shaped structure having two protrusions, the u-shaped structure configured to receive the polished rod, and the outer shell configured to be positioned between the rod clamp and the clamping bar of the rod pump system, wherein the slanted structure is slanted relative to a bottom of the outer shell;
   a load sensor configured to receive a voltage and output a load signal based on a load experienced by the load sensor;
   a position sensor configured to receive a voltage and output a position signal based on a position experienced by the position sensor;
   a load and position signal processor configured to:
      receive and process the load signal from the load sensor and to output load signal data representative of the load experienced by the load sensor, and
      receive and process the position signal from the position sensor and to output position signal data representative of the inclination of the walking beam or the position of the polished rod,
   wherein the load signal processor is internal to the outer shell of the integrated load cell and inclinometer;
   a modulator configured to receive the load signal data and position signal data from the load signal processor, to modulate the load signal data and the position signal data, and to output the modulated load and position signal data, wherein the modulator is internal to the outer shell of the integrated load cell and inclinometer;
   a wireless transmitter configured to receive the modulated load and position signal data from the modulator and to wirelessly transmit the modulated load and position signal data;
   a solar battery configured to provide power to the integrated load cell and inclinometer, the solar battery including:
      a solar panel that is mounted externally on the slanted structure of the outer shell of the integrated load cell and inclinometer;

a battery that is internal to the outer shell of the integrated load cell and inclinometer;

a charger that is internal to the outer shell of the integrated load cell and inclinometer and that is electrically connected to the solar panel and the battery, wherein the charger is configured to receive current from the solar panel and to charge the battery;

wherein the solar battery is configured to provide the voltage to the load sensor and the position sensor; and a wake-up processor electrically positioned between the solar battery and other circuitry including the load sensor, the position sensor, the signal processor, the modulator, and the wireless transmitter, and configured to control power from the solar battery to the other circuitry, wherein the wake-up processor is configured to measure at least one of the load signal and current from the solar panel, and to control power from the solar battery to the other circuitry according to the measurement of the at least one of the load signal and current from the solar panel, wherein the wake-up processor is configured to measure the current from the solar panel and includes a solar power wake-up switch processor; and wherein the solar power wake-up switch processor is configured to provide power from the solar battery to the other circuitry when the current from the solar panel indicates that the integrated load cell and inclinometer is installed on the polished rod.

2. The integrated load cell and inclinometer of claim 1, wherein the position signal output by the position sensor represents an acceleration experienced by the position sensor.

3. The integrated load cell and inclinometer of claim 1, wherein the current from the solar panel indicates that the integrated load cell and inclinometer is installed on the polished rod when the current is greater than a dark current of the solar panel.

4. The integrated load cell and inclinometer of claim 1, wherein the wake-up processor is on a same electrical circuit board as the other circuitry.

5. The integrated load cell and inclinometer of claim 1, further comprising:
an antenna cover that protrudes from the outer shell and is formed of a material different from a material of the outer shell; and
wherein the wireless transmitter includes an antenna within the antenna cover.

6. An integrated load cell and inclinometer for transmitting load data and position data of a polished rod in a rod pump system having a rod clamp fixed to a top of the polished rod and a clamping bar fixed to a hanger harness attached to a horsehead, the horsehead attached to a walking beam, the integrated load cell and inclinometer comprising:
an outer shell including a slanted structure and a u-shaped structure having two protrusions, the u-shaped structure configured to receive the polished rod, and the outer shell configured to be positioned between the rod clamp and the clamping bar of the rod pump system, wherein the slanted structure is slanted relative to a bottom of the outer shell;

a load sensor configured output a load signal based on a load experienced by the load sensor;
a position sensor configured to output a position signal based on a position experienced by the position sensor;
a load and position signal processor configured to:
receive and process the load signal from the load sensor and to output load signal data representative of the load experienced by the load sensor, and
receive and process the position signal from the position sensor and to output position signal data representative of the inclination of the walking beam or the position of the polished rod,
a solar battery configured to provide power to the integrated load cell and inclinometer, the solar battery including a solar panel mounted externally on the slanted structure;
a transmitter configured to transmit the load signal data and position signal data; and
a wake-up processor electrically positioned between the solar battery and other circuitry including the load sensor, the position sensor, the signal processor, and the transmitter, and configured to control power from the solar battery to the other circuitry,
wherein the wake-up switch processor is configured to provide power from the solar battery to the other circuitry when the current from the solar panel indicates that the integrated load cell and inclinometer is installed on the polished rod, and
wherein the wake-up processor is configured to measure at least one of the load signal and current from the solar panel, and to control the power from the solar battery to the other circuitry according to the measurement of the at least one of the load signal and current from the solar panel.

7. The integrated load cell and inclinometer of claim 6,
wherein the wake-up processor is configured to measure the current from the solar panel and includes a solar power wake-up switch processor;
wherein the solar power wake-up switch processor is configured to provide the power from the solar battery to the other circuitry when the current from the solar panel indicates that the integrated load cell and inclinometer is installed on the polished rod.

8. The integrated load cell and inclinometer of claim 7, wherein the current from the solar panel indicates that the integrated load cell and inclinometer is installed on the polished rod when the current is greater than a dark current of the solar panel.

9. The integrated load cell and inclinometer of claim 6, wherein the wake-up processor is on a same electrical circuit board as the other circuitry.

10. The integrated load cell and inclinometer of claim 6, wherein the position signal output by the position sensor represents an acceleration experienced by the position sensor.

11. The integrated load cell and inclinometer of claim 6, further comprising:
an antenna cover that protrudes from the outer shell and is formed of a material different from a material of the outer shell; and
wherein the wireless transmitter includes an antenna within the antenna cover.

* * * * *